Sept. 20, 1927.

R. D. SARVER 1,642,897

TIRE CASING AND TUBE PROTECTOR

Filed Nov. 19, 1925

INVENTOR.
RAY D. SARVER.
BY HIS ATTORNEYS.

Patented Sept. 20, 1927.

1,642,897

UNITED STATES PATENT OFFICE.

RAY D. SARVER, OF OWATONNA, MINNESOTA.

TIRE CASING AND TUBE PROTECTOR.

Application filed November 19, 1925. Serial No. 70,044.

This invention relates to a rim and tire structure for a pneumatic tire and particularly to a tube and casing protector adapted to be disposed over the crack formed in a transversely divided rim. A great many present day automobile tires, especially those of larger size are constructed with comparatively straight sides at the bead portion of the casing and the rim receiving these tires also has substantially straight sides instead of being turned inward to give a clinching effect. Such rims are transversely divided and held together at the divided point by some kind of locking means. This division of the rim forms a crack through which moisture and dirt can pass into contact with the casing. It has, therefore, been the common practice heretofore to have a liner between the casing and tube at the inner part of the casing adjacent the rim, which lining comprises a circumferential strip of rubber or rubber impregnated fabric.

It is an object of this invention to provide a simple and efficient device adapted to be placed over the said crack in the rim which will prevent water, moisture or dirt from passing through said crack into engagement with the casing or tube therein.

It is a further object of the invention to provide such a device adapted to seal the crack in the rim and protect the casing and tube, comprising a strip of yielding material extending transversely of the rim between the same and the casing whereby a liner will not be needed between the tube and casing.

It is more specifically an object of the invention to provide a protecting device for the casing and tube comprising a strip of yielding material adapted to extend transversely of the rim and over the crack therein, which strip has means engaging with the rim to hold the same in proper relation to the rim.

These and other objects and advantages of the invention will be fully set forth in the following description made in connection with the accompanying drawings in which like reference characters refer to the same parts throughout the different views, and in which, Fig. 1 is a view in radial section through the rim and a portion of the tire showing the present invention;

Figure 3:
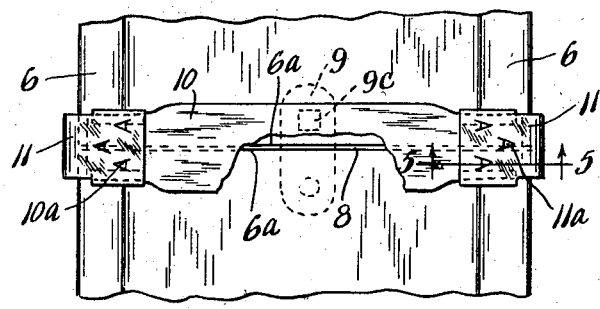
Fig. 3 is a plan view of a portion of the rim at the divided portion showing the device disposed over the crack, a portion of the device being broken away.
Figure 5:
Fig. 5 is a vertical section taken on the line 5—5 of Fig. 3, as indicated by the arrows.
Figure 4:
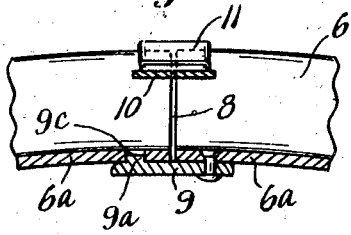
Fig. 4 is a vertical section taken on the line 4—4 of Fig. 2, as indicated by the arrows.

Referring to the drawings, a portion of a rim 6 is shown, such as now used with most tires, particularly, tires of the larger size. The casing 7 of the tire has a bead portion 7ª formed thereon which fits down approximately into the sides of the rim and extends almost to the center thereof. The inner tube 12 of the tire is shown within the casing 7. The rim is divided transversely, the end portions 6ª thereof adjacent the division forming a crack 8, as shown in Fig. 3. In actual practice, the ends of the rim usually are in contact for a portion, at least, of the line of division, the crack 8 being shown somewhat exaggerated in Figs. 3 and 4. The rim is usually provided with some sort of locking device, such as the tongue 9 pivoted to one of the end portions 6ª and having the lug 9ª adapted to seat in the hole or recess 9ᵇ in the other end portion 6ª when the rim is in normal expanded position.

In accordance with the present invention, a member 10 is provided and while this member may take various shapes, in the embodiment of the invention illustrated, the same is shown as comprising a strip of yielding material, such as soft rubber of sufficient width to extend an appreciable distance at each side of the crack 8. The strip 10 extends transversely of the rim in position to have the crack 8 substantially central thereof, and the strip is provided with means engaging the rim 6 to hold the strip in proper position. While various means may be used, in the embodiment of the invention illustrated the strip is shown as provided with clips 11. These clips, in practice are made of very thin metal and will have a negligible thickness in comparison with the thickness of the strip 10. This thickness of the metal in the drawing is greatly exaggerated, as this was necessary in order to illustrate some thickness or body of the metal. The clips 11 are bent around the strip 10 at its side edges and pointed tongues 11ᵃ are struck up from the side of the clips projecting through the rubber strip 10 so that the strip is securely held in said clips. In practice, the metal of clips 11 as stated, is quite thin and when the clips are pressed on the rubber strip the rubber is compressed so that the metal at each side of the rubber strip extends only an exceedingly small distance above the surface of the strip.

Figure 1:
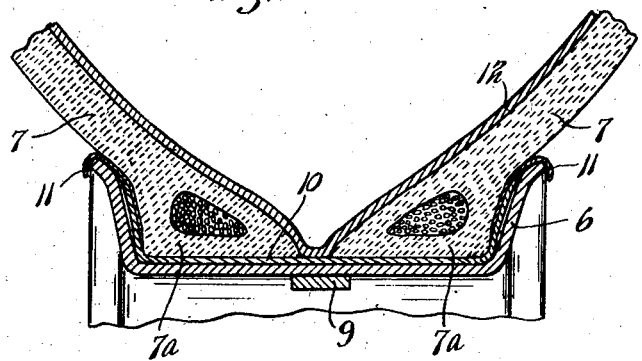
Figure 2:
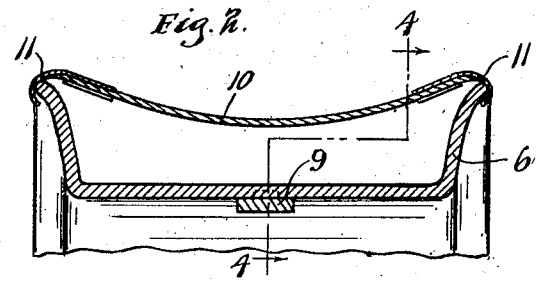
Fig. 2 is a view in radial section showing the device applied to the rim before the tire is applied.

Such rims, as illustrated, are contracted in order to assemble the tire thereon, one of the ends 6ᵃ being drawn inwardly. The strip 10 and clips 11 will be placed over the rim, as shown in Fig. 2 so as to overlie the line of division thereof. The tire is now placed around the rim and the same will press the strip 10 down into the rim, as shown in Fig. 1. As the rim is expanded fully into the tire the end 6ᵃ will move outward substantially so as also to be embraced by the clips 11 and when the rim is fully expanded the device will take the position shown in Fig. 1.

In the operative position of the device shown in Fig. 1 it will be seen that the strip 10 extends transversely of the inner side of the rim over crack 8 so that said crack is entirely covered along the bottom of the rim and upward along the side of the rim for a considerable distance. The strip 10 is held pressed tight against the rim by the pressure of the tire, due to the inflation and pressure of air therein. As stated above, the metal of the clips 11 is quite thin and it will be noticed that there is no metal at the inner side of strip 10 at the central portion thereof, so that strip 10 can press against the sides of the rim over the crack and almost to the outer edge of the rim. There is little tendency for water or moisture to enter the rim at the sides, the water or moisture entering the crack usually at the inner side of the rim where it is thrown out against the inner surface of the rim by centrifugal force. With applicant's structure it is seen that the crack 8 is effectively sealed and no moisture or water can pass therethrough in contact with the casing 7 or tube 12. The casing and tube are thus effectively protected against moisture which would act to rust the rim and rot the casing and tube. With the casing 7 and tube 12 thus protected the liner or strip usually placed between the casing and tube is not necessary and can be eliminated.

From the above description it is seen that applicant has provided a very simple and efficient device for protecting the tube and casing against any dirt, water or moisture entering through the crack in the rim. The device can be made at very small expense and easily placed in position. By using the device the liner can be eliminated and a great saving thus effected. Experience has shown that the inner tubes of the tires usually fail where moisture and dirt penetrate to the outer side of the rim and corrode the rim. This moisture also rots the tire and erosion occurs at the rusted part of the rim so that the material of the tube is so damaged as to destroy the usefulness of the tube. With the present invention the tube is efficiently protected and the moisture cannot reach the inner side of the rim next to the tire to rust the same.

It will, of course, be understood, that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. The combination with a divided rim for use with a tire said rim having a transverse crack therein, of a tube and casing protector comprising a comparatively thin strip of yielding material extending transversely of said rim and disposed over said crack and between said rim and casing of said tire whereby moisture is prevented from passing through said crack into contact with said casing and tube therein.

2. The combination with a divided rim for use with a tire said rim having a transverse crack therein, of a tube and casing protector comprising a comparatively thin strip of yielding material extending transversely of said rim and disposed over said crack and between said rim and casing of said tire, and means secured to said strip and engaging said rim for holding said strip in place.

3. The combination with a divided rim for use with a straight-sided tire, said rim having a transverse crack therein, of a tube and casing protector comprising a comparatively thin strip of yielding material extending transversely of said rim and disposed over said crack and between said rim and casing of said tire, and clips secured to the ends of said strip for engaging over the edge of the rim for holding said strip in place.

4. The combination with a rim for use with a pneumatic tire, said tire being divided so as to have a transverse crack therein, of a member extending transversely of said rim and disposed over said crack and between said rim and the casing of said tire so as to close said crack, and means secured to said member for holding said member in place.

In testimony whereof I affix my signature.

RAY D. SARVER.